United States Patent [19]

Unuma

[11] Patent Number: 4,940,449

[45] Date of Patent: Jul. 10, 1990

[54] PAPER FEED TRACTOR

[75] Inventor: Sadao Unuma, Oobu, Japan

[73] Assignee: Tokai Kogyo Kabushiki Kaisha, Oobu, Japan

[21] Appl. No.: 416,477

[22] Filed: Oct. 3, 1989

[30] Foreign Application Priority Data

Nov. 19, 1988 [JP] Japan ................................ 63-291100

[51] Int. Cl.[5] ................................................ F16H 7/18

[52] U.S. Cl. ...................................... 474/140; 474/144

[58] Field of Search ................ 474/140, 153, 144–147, 474/101, 901; 74/608; 180/84; 280/159, 160

[56] References Cited

U.S. PATENT DOCUMENTS

| | | | |
|---|---|---|---|
| 3,575,474 | 4/1971 | Russ, Sr. | 474/901 X |
| 4,422,396 | 12/1983 | Szostak | 474/144 X |
| 4,642,073 | 2/1987 | Restelli | 474/140 X |
| 4,767,386 | 8/1988 | Spaggiari | 474/144 X |
| 4,869,708 | 9/1989 | Hoffman et al. | 474/140 |

*Primary Examiner*—Thuy M. Bui

*Attorney, Agent, or Firm*—Berman, Aisenberg & Platt

[57] ABSTRACT

A paper feed tractor comprising a tractor frame including a pair of side frames and a belt guide disposed between and coupled to the side frames, a sprocket wheel supported for rotation between the two side frames, an endless belt adapted to be driven by the sprocket wheel to slidably travel on guide walls formed on three peripheral faces of the belt guide, and a cover mounted at a side thereof for pivotal motion on one of the side frames from and to a position in which it extends on a linear one of the guide walls of the belt guide. The endless belt has feed pins provided projectingly in a row at equal intervals on an outer peripheral face thereof, and a paper holder provided on the cover is positioned, on at least one side of the feed pins, in parallel to the outer peripheral face of the endless belt. The outer peripheral face of the endless belt has a non-slipping face formed thereon on which concave and convex portions of a small difference in dimension are formed to reduce a possible slip between the outer peripheral face of the endless belt and paper transported by the endless belt.

2 Claims, 4 Drawing Sheets

PAPER FEED TRACTOR

BACKGROUND OF THE INVENTION

1. Field of the Invention

This invention relates to a paper feed tractor for supplying paper having feed holes formed along the opposite longitudinal edges therein to a printer for use with a computer, a word processor, a plotter and so forth or to a printer of various other types.

2. Description of the Prior Art

Paper having a pair of rows of feed holes or perforations formed in an equidistantly spaced relationship therein along the opposite longitudinal edges thereof is used very frequently on a printer for use with a computer, a word processor, a plotter or the like as paper on which characters or figures outputted from the printer are to be recorded. A paper feeding device for supplying paper of the type mentioned to a printer normally includes a pair of paper feed tractors disposed at locations adjacent the opposite longitudinal edges of paper to be fed by the paper feeding device. An exemplary one of such paper feed tractors which are widely known in the art includes a sprocket wheel supported for rotation on a tractor frame, a belt guide formed on the tractor frame, and an endless belt extending between the sprocket wheel and the belt guide and adapted to be driven by the sprocket wheel to travel along a guide path formed by the belt guide. The endless belt has feed pins provided projectingly in a row on an outer peripheral face thereof at the same equal intervals with feed holes formed in a row along a longitudinal edge of paper of the type described above.

Further, a paper feed tractor of the type just mentioned normally has such a construction that a semi-arcuate guide portion having a substantially same diameter as the outer diameter of the sprocket wheel are formed at a location of the belt guide remote from the sprocket wheel while a pair of linear guide portions are formed in a contiguous relationship to the semi-circular guide portion in directions tangential to an outer periphery of the sprocket wheel such that the endless belt may travel along arcuate guide paths on the sprocket wheel and the semi-arcuate guide portion and linear guide paths contiguous in a circumscribing relationship to the arcuate guide paths, and paper is fed by the endless belt while the endless belt travels along one of the linear guide paths.

When a character or a figure is to be printed on paper on the printer, normally a high speed paper feeding motion is transmitted to the endless belt and such motion and stopping are transmitted to the endless belt intermittently and repetitively. On the one linear guide path, the endless belt feeds the paper by way of the feed pins provided projectingly on the outer peripheral face thereof two or more of which pins are simultaneously engaged with the feed holes formed along the corresponding longitudinal edge of the paper. The feed pins provided projectingly on the endless belt are each formed, at an end portion thereof, in a truncated conical shape in order to facilitate insertion of the feed pin into a feed hole formed in paper. Further, in order to facilitate release of each feed pin from a feed hole, the outer diameter of a portion of each feed pin at which the feed pin engages with a feed hole of paper is made a little smaller than the diameter of the feed hole. Due to such difference in diameter between the feed holes and the feed pins, if the endless belt is stopped abruptly while the paper is moving at the same speed together with the endless belt, the paper will be stopped, as a result of continued movement due to inertia of the mass thereof, at a position advanced by a distance corresponding to the difference in diameter from the stopped position of the endless belt. Then, if the endless belt is subsequently moved suddenly, then the feed pins of the endless belt will first travel by the distance corresponding to the difference in diameter and then collide and be engaged with end edges of the feed holes of the paper to thereafter cause the paper to travel. Therefore, where the quality of the paper is low or the humidity of external air is high, the paper may be deformed or broken at portions of the feed holes thereof at which the feed pins of the endless belt are collidingly engaged with the feed holes. Further, since the feed holes are formed proximate the opposite longitudinal edges of the paper, the paper is normally acted upon by a force to tend to move the paper toward a central location of the paper perpendicularly to the direction of travel of the endless belt due to resistance applied to the paper by a printing mechanism, a platen and so forth of the printer. Such phenomenon of deformation of feed holes of paper or break of paper is promoted by the force, which makes a cause of deterioration in accuracy in paper feeding and in accuracy in printing of the printer.

SUMMARY OF THE INVENTION

It is an object of the present invention to provide a paper feed tractor which can transmit motion and stopping of an endless belt to paper with a high degree of accuracy.

Generally speaking, the present invention provides a paper feed tractor for transporting paper having feed holes formed in a row in an equidistantly spaced relationship along a side edge thereof. The paper feed tractor according to the present invention comprises a tractor frame, a belt guide formed on the tractor frame, a sprocket wheel supported for rotation on the belt guide, and an endless belt extending between the sprocket wheel and the belt guide and adapted to be driven by the sprocket wheel to travel along a guide path formed by the sprocket wheel and the belt guide, the endless belt having feed pins provided projectingly on an outer peripheral face thereof in a row at the same equal intervals to those of the feed holes formed along the side edge of the paper such that the feed pins may be engaged with the feed holes of the paper to feed the paper. Further, the belt guide has a liner guide portion thereon, and a cover is supported at a side edge of the tractor frame along the linear guide portion of the belt guide for selective pivotal motion between a first position in which the cover extends substantially in a parallel relationship above the linear guide portion of the belt guide and a second position in which the cover opens a location above the linear guide portion of the belt guide. A paper holder is provided on a face of the cover opposing to the linear guide portion of the belt guide. The paper holder has such a construction that it is formed from a plate in the form of an elongated planar plate and bent at the longitudinal opposite end portions thereof to support the paper holder on the face of the cover opposing to the linear guide portion of the belt guide such that a main portion of the paper holder is spaced from the face of the cover. When the cover is at the first position, the main portion of the paper holder is disposed in an opposing relationship to the linear guide portion of the belt guide in parallel to the longitudinal direction of the linear guide portion and is positioned in parallel to the outer peripheral face of the endless belt on at least one side of the feed pins of the endless belt which travels on the linear guide portion of the belt guide. Further, according to the present invention, a peripheral face portion of the outer peripheral face of the endless belt on which the feed pins are provided projectingly is formed into a non-slipping face on which concave and convex portions of a small difference in dimension are formed such that, when said cover is at the first position, the distance between the convex portions of the non-slipping face of the endless belt and a face of the main portion of the paper holder opposing to the convex portions is made smaller than the thickness of the paper.

Further, according to the present invention, an elongated hole is formed in the main portion of the paper holder in a longitudinal direction thereof so as to construct a single paper holder having the main portion which extends in parallel to the outer peripheral face of the endless belt on both sides of the feed pins of the endless belt.

With the paper feed tractor according to the present invention, when the cover is positioned to the second position to expose the endless belt, a paper is supplied on the endless belt with the feed holes of paper being engaged with the feed pins of the endless belt. Thereafter the cover is positioned to the first position, and a the sprocket wheel is driven to rotate by a drive shaft connected to a driving source similarly as in the prior art paper feed tractor. Then the endless belt is driven by the sprocket wheel to travel along the guide paths formed by the sprocket wheel and the belt guide. While the endless belt travels along the linear one of the guide paths formed by the belt guide, two or more of the feed pins provided projectingly on the outer peripheral face of the endless belt are engaged simultaneously with the feed holes formed along the side edge of the paper to feed the paper at the same speed with the endless belt.

In this instance, since the paper is pressed at one face thereof by the main portion of the paper holder disposed on the cover and is contacted at the other face thereof with non-slipping face of the endless belt on which the concave and convex portions are formed, the paper is normally held in a condition wherein the opposite faces thereof are held lightly between the main portion of the paper holder and the non-slipping face of the endless belt.

Even if, while the endless belt is being trasported by the power transmitted to the sprocket wheel in this condition, the sprocket wheel and the endless belt are stopped abruptly or started to move suddenly or repetitively stopped and moved abruptly, a possible slip between the paper and the peripheral face portion of the endless belt is decreased remarkably due to increase in contact area caused by engagement of steps between the convex and concave portions forming the non-slipping face of the peripheral face portion of the endless belt with the concave and convex portions of the surface of the paper caused by paper fiber produced in manufacturing process of paper and also due to increase in coefficient of friction between them, the possibility that displacement between the endless belt and the paper which may be caused by inertia of the paper when the endless belt is stopped abruptly or started to move suddenly can be prevented, and so-called dancing of paper can be eliminated. Further, a force to tend to move the paper toward a central location of the paper perpendicularly to the direction of travel of the endless belt due to resistance applied to the paper by a printing mechanism, a platen and so forth of the printer can be eliminated by the phenomenon of engagement between the concave and convex portions of the paper and the steps of the concave and convex portions forming the non-slipping face of the peripheral face portion of the endless belt. Accordingly, deformation of the feed holes of the paper or break of the paper which is conventionally caused by a slip between the paper and the endless belt can be eliminated, and the accuracy in paper feeding can be improved.

Further, where the paper holder has an elongated hole formed along the longitudinal direction in the main portion thereof in accordance with the present invention, when the endless belt travels, the feed pins provided projectingly on the endless belt can move freely in the elongated hole. Accordingly, using the single paper holder, possible interference between the paper holder and the feed pins can be eliminated and the paper can be held between the paper holder and the endless belt at locations very close to the feed pins.

It is to be noted that, where the paper holder is molded from a synthetic resin material having a low sliding resistance to paper such as, for example, a nylon or polyacetal resin or a resin containing such resin as a principal component, for example, from a resin having a coefficient of friction from 0.1 to 0.4 or else has a layer of such resin material formed only on a sliding face for contacting with paper, the paper feed tractor is further improved in paper feeding accuracy with reduced sliding resistance between the paper holder and paper.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

The drawings show a preferred embodiment of the paper feeding device (tractor) located at a position corresponding to one of the side edges of a paper formed with a pair of rows of feed apertures at both side edges thereof.

Figure 1:
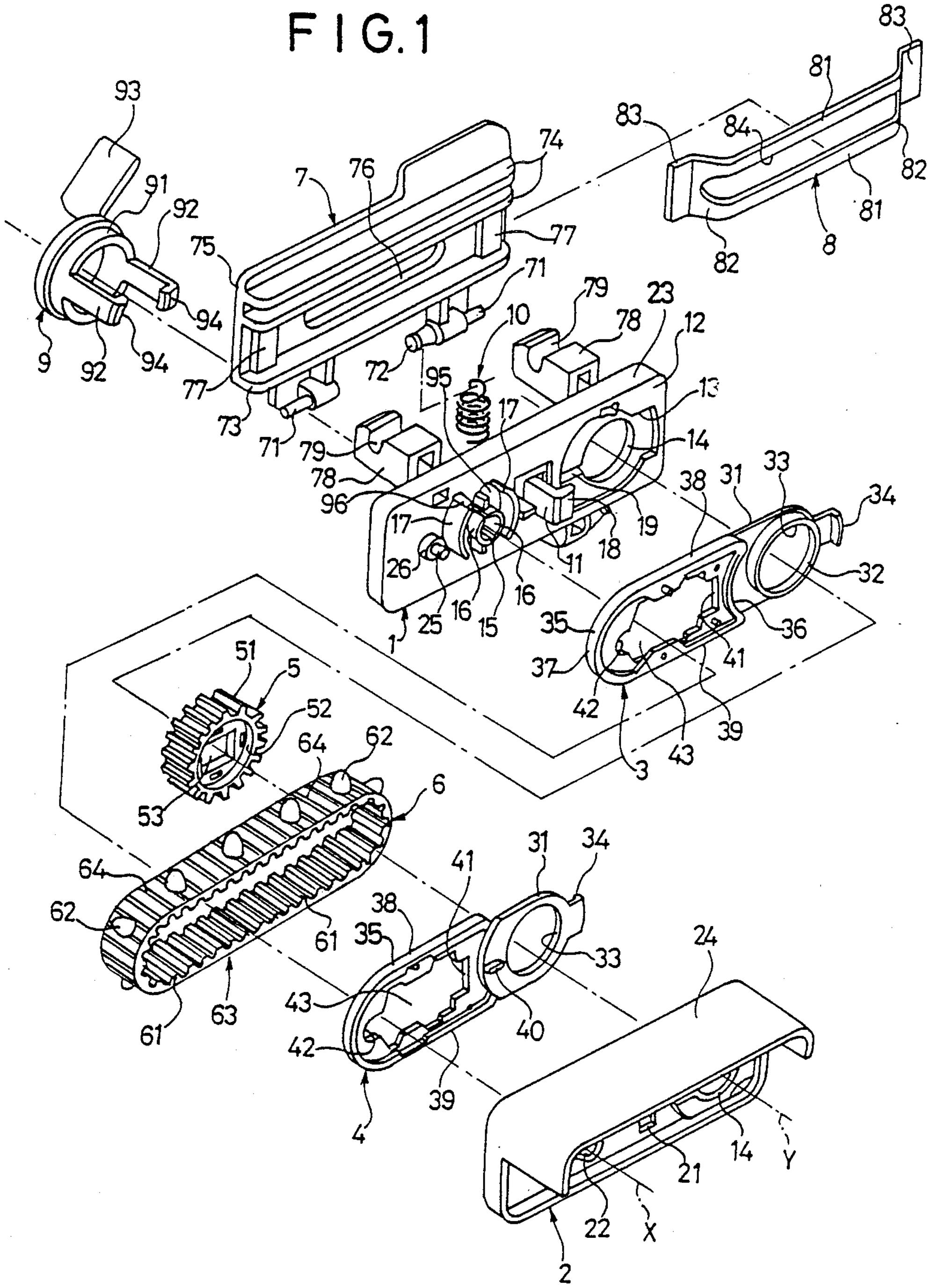
FIG. 1 is a fragmentary perspective view of a paper feed tractor showing an embodiment of the present invention.

FIG. 1 is a fragmentary perspective view showing various parts of a paper feed tractor according to the present invention in such a disassembled condition as to facilitate understanding of relationships among the parts. Referring to FIG. 1, the paper feed tractor of the embodiment shown includes a first side frame 1, a second side frame 2, a first belt guide 3, a second belt guide 4, a sprocket wheel 5, an endless belt 6, a cover 7, a paper holder 8, a locking lever 9 and a spring 10 all assembled in such a manner as hereinafter described. It is to be noted that reference character X denotes a center axis of a fixed shaft provided in a printer in which the paper feed tractor is installed, and reference character Y denotes a center axis of a drive shaft of a motor which serves as a driving source for the printer.

A frame of the paper feed tractor is constructed such that the first and second belt guides 3 and 4 each having a substantially elliptic front elevation smaller by a size than that of the side frames 1 and 2 are held in an opposing relationship like a sandwich between the first and second side frame 1 and 2 each having a generally rectangular front elevation, and a connecting pawl 11 formed projectingly in an integral relationship on the first side frame 1 is engaged with an angular hole 21 formed in the second side frame 2 to securely connect the four parts.

The first and second belt guides 3 and 4 are shaped so as to have the same structure, and a support wall 32 in the form of a cylindrical wall is formed at a location adjacent a longitudinal end portion on each of opposing faces of first base plates 31 of the first and second belt guides 3 and 4. A through hole 33 is defined by an inner wall face of each of the support walls 32. The cylindrical support walls 32 of the first and second belt guides 3 and 4 are adapted to support at outer peripheral faces thereof stepped portions 52 of a cylindrical faces formed on opposite end faces of the sprocket wheel 5 around the center axis of the sprocket wheel 5 (coincident with the center axis Y) and at an inner portion of a peripheral face portion of the sprocket wheel 5 on which teeth 51 are formed, thereby supporting the sprocket wheel 5 for rotation between the first and second belt guides 3 and 4. An arcuate stopper wall 34 having a small circumferential length is formed in a concentrical relationship with the support wall 32 at a free end of the base plate 31 of each of the first and second belt guides 3 and 4 in a spaced relationship by a small distance from an end of a tooth 51 of the sprocket wheel 5 supported on the support walls 32 and extends in the same direction as the support wall 32.

Each of the first and second belt guides 3 and 4 has a second base plate 35 formed in an integral and contiguous relationship to and in an offset relationship from the first base plate 31 by a distance equal to the thickness of the first base plate 31. An inner wall portion 36 having an arcuate configuration concentrical with the support wall 32 is formed at a connecting portion between the first and second base plates 31 and 35, that is, at an end portion of the second base plate 35 adjacent the support wall 32, in a spaced relationship by a small distance from the support wall 32 and extends in the same direction as the support wall 32. A semi-arcuate belt guide wall 37 is formed at the free end portion of the second base plate 35 remote from the first base plate 31 and extends in the same direction as the inner wall portion 36 from the second base plate 35. The belt guide wall 37 is convexed in the same direction in a plane of the second base plate 35. Further, the opposite end portions of the inner wall portion 36 and the opposite end portions of the belt guide wall 37 are interconnected by a pair of linear belt guide walls 38 and 39 which extend in parallel to each other such that the inner wall portion 36 and the belt guide walls 37, 38 and 39 may form a closed peripheral wall which has a uniform height or extent from the second base plate 35. A first recess 13 is formed on a face 12 of the first side frame 1 opposing to the second side frame 2. The first recess 13 has such a peripheral shape as to allow the first recess 13 to closely fit with an outer peripheral edge of the first base plate 31 of the first belt guide 3 and has a depth substantially equal to the thickness of the first base plate 31 of the first belt guide 3. Thus, the first belt guide 3 is fitted at the first base plate 31 thereof in the first recess 13 of the first side frame 1 with the longitudinal direction thereof coinciding with the longitudinal direction of the first side frame 1. The first side frame 1 further has a circular opening 14 perforated at a substantially central location of the first recess 13 thereof. The circular opening 14 has a substantially same diameter with the through holes 33 formed in the belt guides 3 and 4.

A pair of semi-cylindrical support walls 16 are formed projectingly in an integral relationship on the first side frame 1 at a location spaced by a distance equal to the distance between the center axes Y and X of the drive shaft and the fixed shaft from the center of the opening 14 in the longitudinal direction of the side frame 1. The semi-cylindrical support walls 16 are separated from each other by a pair of slits 15 and extend in a concentric relationship to each other. The first side frame 1 has a circular opening (not shown) formed at a location thereof surrounded by the semi-circular support walls 16. A pair of guide walls 17 are formed projectingly in an opposing relationship on the radially outer sides of the semi-cylindrical support walls 16. Each of the guide walls 17 has an arcuate wall face having a radius greater than the radius of an outer periphery of each of the support walls 16. The first side frame 1 has aforementioned connecting pawl 11 formed projectingly in an integral relationship at a location thereof between the first recess 13 and one of the guide walls 17 adjacent the first recess 13 and projected toward the second side frame 2. The connecting pawl 11 is formed as a post having a rectangular section and having a generally rather high resiliency, and a pawl portion 18 is formed at and extends laterally from an end of the connecting pawl 11. A linear second recess 19 is formed in the bottom of the first recess 13 of the first side frame 1 and extends in the direction along a line interconnecting the center of the opening 14 and the center of the circular opening defined by the semi-cylindrical support walls 16. Thus, when the first base plate 31 of the first belt guide 3 is fitted closely at the outer peripheral edge thereof with the first recess 13 of the first side frame 1, a linear engaging rib 40 provided projectingly on a face of the first base plate 31 of the first belt guide 3 opposing to the side frame 1 is engaged with the second recess 19 of the first side frame 1. Further, a circular engaging projection 26 is formed at the other end portion of the first side frame remote from the opening 14 farther than the guide walls 17 and extends in parallel to the side walls 17. The engaging projection 26 has an engaging post 25 of a reduced diameter formed in a concentrical relationship at an end thereof.

A first recess 13, an opening 14 and a second recess 19 are formed in a face of the second side frame 2 opposing to the side frame 1 in a similar manner to those of the first side frame 1, and the rectangular hole 21 is formed at a location of the face of the second side frame 2 opposing to the connecting pawl 11 of the first side frame 1 so as to allow the pawl portion 18 of the connecting pawl 11 to pass therethrough and allow a side edge thereof to abut with a major portion of the connecting pawl 11 to engage the pawl portion 18. Further, a tubular projection (not shown) having a diameter equal to the diameter of the semi-cylindrical support walls 16 of the first side frame 1 is formed on the face of the second side frame 2 such that it may be contacted by ends of the semi-cylindrical support walls 16, and a circular opening 22 is formed in the second side frame 2 at a location defined by the tubular projection. In addition, an engaging projection (not shown) is provided projectingly at a location of the face of the second side frame 2 opposing to the engaging projection 26 provided on the first side frame 1. The engaging projection has an inner bore to fit with the engaging post 25 provided at the end of the engaging projection 26 and has an outer diameter equal to the outer diameter of the engaging projection 26.

An opening 43 is formed at a central location of the second base plate 35 of each of the first and second belt guides 3 and 4 which are surrounded by the inner wall portion 36 and the belt guide walls 37, 38 and 39. The opening 43 has a linear end wall 41 at a longitudinal end thereof for contacting with a side wall of the connecting pawl 11 having a rectangular cross section and an arcuate end wall 42 at the other longitudinal end thereof for engaging over a substantially half circumference with the engaging projection 26. The opening 43 has further end walls having such a configuration as to allow the guide walls 17 to be fitted loosely in the opening 43.

The first and second side frames 1 and 2 and the first and second belt guides 3 and 4 are each formed in an integral relationship from a synthetic resin material so as to have such a construction as described hereinabove. Besides, they are designed so that they may have a substantially same thickness in section.

Thus, if the first and second belt guides 3 and 4 are held together with the cylindrical support walls 32 thereof being held in an opposing relationship to each other and with the cylindrical steps 52 of the sprocket wheel 5 being fitted on the support walls 32, then end portions of the inner wall portions 36 and the belt guide walls 37, 38 and 39 of the first and second belt guides are contacted with each other and the sprocket wheel 5 is supported for rotation between the belt guides 3 and 4. Subsequently, the first base plate 31 of the first belt guide 3 is fitted into the first recess 13 formed on the first side frame 1 while the linear end wall 41 formed at the opening 43 of the first belt guide 3 is disposed along the major portion of the connecting pawl 11 of the first side frame 1, then the second base plate 35 of the first belt guide 3 is extended along the first side frame 1 and the arcuate end wall 42 formed at the opening 43 is engaged with the engaging projection 26. In this condition, the first belt guide 3 is positioned on the side face of the first frame 1 due to engagement between the peripheral edge of the first base plate 31 of the first belt guide 3 and the peripheral edge of the first recess 13 of the first side frame 1, engagement between the linear engaging rib 40 and the second recess 19, engagement between the linear end wall 41 of the opening 43 and the side edge of the major portion of the connecting pawl 11 and engagement between the arcuate end wall 42 of the opening 43 and the other peripheral edge of the engaging projection 26. Subsequently, the second side frame 2 is placed on the second belt guide 4 and the pawl portion 18 formed at the end of the connecting pawl 11 is inserted into the rectangular hole 21 formed in the second side frame 2 while deflecting the major portion of the connecting pawl 11 projected from the first side frame 2 by its own resiliency, then at the same time when the pawl portion 18 passes the angular hole 21, the major portion of the connecting pawl 11 is returned to its original condition by its own resiliency until it is engaged with a side edge of the rectangular hole 21. Further, the second belt guide 4 is positioned on the side face of the second side frame 2 due to engagement between the peripheral edge of the first recess 13 of the second side frame 2, engagement between the linear engaging rib 40 and the second recess 19, engagement between the linear end wall 41 of the opening 43 and the side edge of the major portion of the connecting pawl 11 and engagement between the arcuate end wall 42 of the opening 43 and the outer peripheral edge of the engaging projection 26. Further, the four members including the first and second side frames 1 and 2 and the first and second belt guides 3 and 4 are assembled in an integral relationship as the engaging post 25 at the end of the engaging projection 26 formed on the first side frame 1 is arrested at the end of the engaging projection formed on the second side frame 2 and the pawl portion 18 of the connecting pawl 11 formed on the first side frame 1 is engaged with the rectangular hole 21 formed in the second side frame 2. It is to be noted that, in order to improve positioning of the four members described above, mutually engaging projections and recesses or projections or the like for maintaining the distance between those members may be formed suitably at locations of the mutually corresponding members as seen from FIG. 1.

The endless belt 6 is assembled at the stage at which the sproket wheel 5 is held between the first and second belt guides 3 and 4 such that it is stretched along the belt guide walls 37, 38 and 39 and teeth 61 formed on an inner peripheral face thereof are meshed with teeth 51 formed on an outer peripheral face of the sprocket wheel 5.

A pair of bearing members 78 are securely mounted on an outer side face of the first side frame 1 in a contacting relationship on an upper edge of the first side frame 1. Each of the bearing members 78 has a rectangular cross section and is made hollow in the inside thereof. A bearing groove 79 having a substantially U-shaped cross section is formed in each of the bearing members 78 such that the bearing grooves 79 may lie on a same straight line. A pair of support shafts 71 are formed projectingly on a side edge of the cover 7 and fitted loosely in the bearing grooves 79 of the bearing members 78 on the first side frame 1 to support the cover 7 for movement between a first position in which the cover 7 covers over an upper face of an assembly of the side frames 1 and 2 and belt guides 3 and 4 and another or a second position in which the cover 7 opens the upper face of the assembly. A pin 72 is disposed at a location of the cover 7 adjacent one of the support shafts 71 offset nearer to the cover 7 than the support shaft 71. The coil spring 10 is stretched between the pin 72 and a suitable location of the outer side face of the first side frame 1 to normally urge the cover 7 to the first position at which the cover 7 covers over the upper face of the assembly.

A rib 73 is formed on a rear face of a cover plate 75 of the cover 7 opposing to the assembly in an opposing relationship to a peripheral edge portion 23 of the first side frame 1 while a pair of ribs 74 are formed on the rear face of the cover 7 in an opposing relationship to an enlarged peripheral edge portion 24 of the second side frame 2. The ribs 73 and 74 extend in parallel to the longitudinal direction of the first and second belt guides 3 and 4. The cover plate 75 has an elongated hole 76 formed therein between the rib 73 and one of the ribs 74 nearer to the rib 73. The elongated hole 76 extends in a direction parallel to the ribs 73 and 74. A pair of support plates 77 are provided at locations of the cover plate 75 adjacent the longitudinal opposite ends of the elongated hole 76 and extend perpendicularly to the ribs 73 and 74 between the ribs 73 and 74 with small gaps left from the rear face of the cover plate 75. The cover 8 having such a construction as described above is also molded in an integral relationship from a synthetic resin material.

The paper holder 8 generally presents the form of a thin, elongated plate having a width a little smaller than the distance between the rib 73 and the adjacent rib 74. A pair of guide portions 81 which occupy a main portion centrally of the paper holder 8 in the longitudinal direction present each the form of a flat plate, and the opposite end portions of the main portion of the paper holder are 8 formed as arcuate portions 82 which are bent in the same direction along the thickness of the paper holder 8. The opposite end portions of the paper holder 8 in the longitudinal direction are formed into a pair of small flattened arresting end portions 83 which extend in a plane parallel to the guide portions 81. The paper holder 8 has an elongated hole 84 perforated therein which extends over the entire length of the guide portions 81 to part of the arcuate portions 82 connecting to the guide portions 81 in the longitudinal direction of the guide portions 81. The paper holder 8 is mounted on the cover 7 as the arresting end portions 83 formed at the opposite end portions thereof are inserted and arrested between the support plates 77 of the cover 7 and the rear face of the cover plate 75, and the guide portions 81 which occupy the central main portion of the paper holder 8 are projected from the face of the cover 7 opposing to the assembly such that they may oppose to the endless belt 6 of the assembly.

The paper feed tractor formed in such a manner as described above is positioned and secured by means of the locking lever 9 which will be hereinafter described to the fixed shaft in the form of a circular column which is provided in the printer and extends through the circular opening surrounded by the pair of semi-cylindrical support walls 16 of the first side frame 1 of the paper feed tractor and through the circular opening 22 of the second side frame 2. Meanwhile, the drive shaft in the form of an angular column having a rectangular cross section and connected to the drive shaft of a motor is extended into the opening 14 of the first side frame 1 and engaged with and connected to an angular hole 53 formed around the center axis of the sprocket wheel 5 and exposed in the through holes formed in the first and second belt guides 3 and 4. The drive shaft extends into the opening 14 formed in the second side frame 2. The drive shaft thus transmits power of the motor to the sprocket wheel 5.

The locking lever 9 includes an annular gripping portion 91, a pair of gripping members 92 extending from an end of the cylindrical portion 91 in the direction of parallel to an axis of the cylindrical portion 91, and a gripping lever 93 formed at the other end of the gripping portion 91. Portions of the gripping members

92 which extend in the axial direction are formed into angular columns having a rectangular cross section and have gripping pawls 94 formed at free end portions thereof. The gripping pawls 94 extend laterally radially inwardly of the gripping portion 91. The gripping members 92 are disposed at locations of the gripping portion 91 opposing in a diametrical direction to each other, and the distance between the gripping pawls 94 in the diametrical direction is smaller than the diameter of a cylindrical wall formed by the outer peripheral walls of the pair of semi-cylindrical support walls 16 of the first side frame 1. The first side frame 1 has a pair of arcuate through holes 95 formed over the lengths of the arcs of the guide walls 17 between the semi-cylindrical support walls 16 and the guide walls 17 which are provided on the radially outer sides of the semi-cylindrical support walls 16, and a pair of through holes 96 having a size sufficient to allow the passage of the gripping pawls 94 of the locking lever 9 therethrough are formed in a symmetrical relationship by 180 degrees with respect to the center of the circular opening surrounded by the semi-cylindrical support walls 16 at one end portions of the arcuate through holes 95. The gripping pawls 94 provided at the ends of the gripping members 92 of the locking lever 9 are inserted into the first side frame 1 by way of the through holes 96 spaced from the guide walls 17, then since the distance between the ends of the gripping pawls 94 is smaller than the diameter of the outer peripheral faces of the semi-cylindrical support walls 16, the gripping members 92 are inserted along the outer peripheral faces of the semi-cylindrical support walls 16 in a condition wherein the ends thereof are opened, and when the gripping pawls 19 reach the free ends of the semi-cylindrical support walls 16, the gripping pawls 94 are engaged with the free ends of the semi-cylindrical support walls 16 by the resilient forces of the gripping members 92. Consequently, the locking lever 9 is arrested at the first side frame 1 for turning motion around the semi-cylindrical support walls 16 without being let off. When the gripping lever 93 is gripped to turn the locking lever 9, then the gripping members 92 are moved from the end portions to the central portions of the actuate through holes 95, the semi-cylindrical support walls 16 are deflected radially inwardly with respect to reaction points provided by the guide walls 17 to increase the frictional engaging force with the fixed shaft since the inner peripheral faces of the guide walls 17 formed on the first side frame 1 are formed with a larger diameter than the diameter of a concentric circle of the outer peripheral faces of the semi-cylindrical support walls 16 being insecribed in central portions of the inner peripheral faces of the guide walls 17. Consequently, the assembly of the paper feed tractor is fixed to the fixed shaft. Accordingly, the paper feed tractor can be secured to an arbitrary position of the printer so that the feed pins 62 provided projectingly at predetermined intervals on the outer peripheral face of the endless belt 6 which is drive to travel by the sprocket wheel 5 may be positioned with respect to feed holes formed along a longitudinal edge of paper to be transported by the printer.

Also the locking lever 6 having such a construction as described above may be formed in an integral relationship from a synthetic resin material.

In the paper feed tractor of the embodiment described above, when the cover 7 is at the position at which it covers over the assembly of the first and second side frames 1 and 2 and the first and second belt guides 3 and 4, the linear guide portions 81 of the paper holder 8 with the arresting end portions 83 thereof arrested by the support plates 77 of the cover 7 are positioned just above the endless belt 6 which is driven by the sprocket wheel 5 to travel along the linear guide walls 38 of the belt guides 3 and 4, and the guide portions 81 are positioned in an opposing spaced relationship by a small distance from a peripheral face portion 63 of the endless belt 6 on which the feed pins 62 are provided projectingly while they allow the feed pins 62 formed projectingly on the outer peripheral face of the endless belt 6 to travel in the elongated hole 84 of the paper holder 8. Thus position of the cover 7 is referred to as a first position of the cover 7. To the contrary, the position of the cover 7 to which the cover 7 is lifted against the urging force of the spring 10 to open the upper face of the endless belt 6 is referred to as a second position of the cover 7.

A paper 90 is inserted in the paper feed tracter with the feed holes formed in the paper 90 to be transported are engaged with the feed pins 62 of the endless belt 6 in the second position of the cover 7 and then the cover 7 is positioned to the first position and rotating power of the motor is transmitted to the sprocket wheel 5 by way of the drive shaft, then the endless belt 6 is driven to travel along the linear guide portions 38 by the power transmitted thereto from the teeth 51 of the sprocket wheel 5 by way of the teeth 61 of the inner peripheral portion of the endless belt 6.

Figure 2:
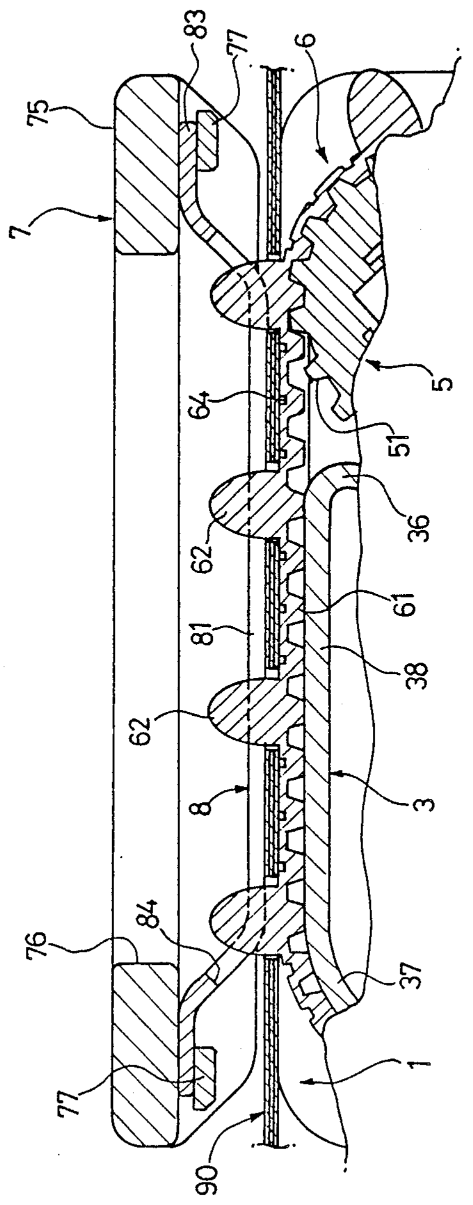
FIG. 2 is an enlarged sectional view showing part of the paper feed tractor of FIG. 1.
Figure 3:
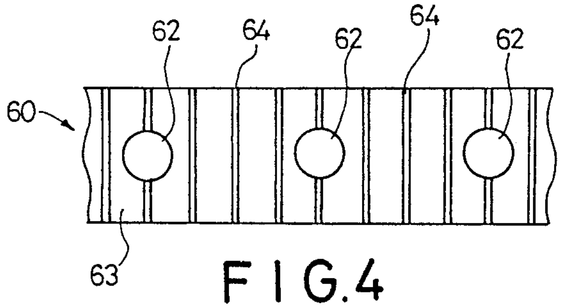
FIG. 3 is a front elevational view of part of an endless belt of the paper feed tractor of FIG. 1.
Figure 4:
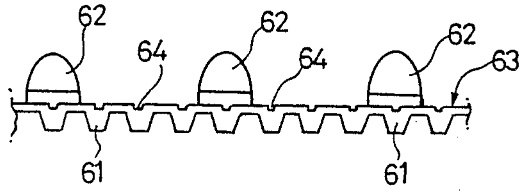
FIG. 4 is a side elevational view of the paper feed tractor of FIG. 1.

According to the present invention, the peripheral face portion 63 of the endless belt 6 is formed as a non-slipping face on which concave and convex portions of a small difference in dimension are formed as shown in FIG. 2, and when the cover 7 is at the first portion, the distance between the convex portions of the non-slipping face of the endless belt 6 and the plane of the opposing guide portions 81 constituting the main portion of the paper holder 8 is made smaller then the thickness of the paper 90. In the embodiment described above, four grooves 64 are formed at equal intervals between each adjacent ones of the pins 62 on the peripheral face portion 63 of the endless belt 6 including the groove 64 provided at the position of each feed pin 62 as shown in FIGS. 3 and 4, and the distance between the outer peripheral face of the peripheral face portion 63 located between the slits 64 and the opposing faces of the guide portions 81 of the paper holder 8 is made smaller than the thickness of the paper 90. The number of the grooves is not limited to four, and any number of such grooves equal to or greater than 2 and equal to or smaller than 8 or so may be provided. Further, the distance between the bottoms of the grooves 64 and the plane of the guide portions 81 may preferably be made substantially equal to the thickness of the paper 90.

Figure 5:
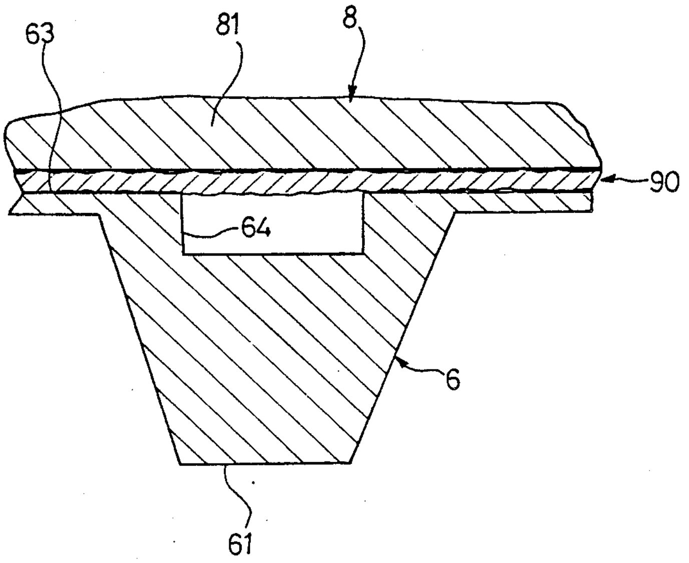
FIG. 5 is an enlarged sectional view of part of the paper feed tractor of FIG. 1.

With the paper feed tractor of the present embodiment, in case the cover 7 is positioned to the second position and the feed holes of paper to be transported are engaged with the feed pins 62 of the endless belt 6 whereafter the cover 7 is positioned to first position and than power of the driving source is transmitted to the sprocket wheel 5, immediately after the endless belt 6 starts its traveling movement, the feed pins 62 are contacted with front portions of inner circumferential edges of the feed holes of the paper 90 in the transporting direction to start transporation of the paper 90. The paper 90 is thereafter transported at the same speed with the endless belt 6. In this instance, the paper holder 8 of the cover 7 slidably contacts at the main portion of the guide portions 81 with a face of the paper 90 to press the other face of the paper 90 lightly against the peripheral face portion 63 of the endless belt 6. Since the paper 90 has on a surface thereof convex and concave portions caused by paper fiber produced in manufacturing process of paper as shown in an exaggerated manner in FIG. 5, a possible slip between the paper 90 and the peripheral face portion 63 of the endless belt 6 is decreased remarkably under the pressing force due to increase in contact area caused by engagement of the convex and concave portions provided by formation of the grooves 64 on the peripheral face portion 63 of the endless belt 6 and also due to increase in coefficient of friction between them. Consequently, even if the endless belt 6 is stopped abruptly and then started to move suddenly, dispersion of the stopping position due to inertia of the paper and displacement between the endless belt 6 and the paper 90 can be prevented, and accordingly, damage to or deformation of the feed holes of the paper can be eliminated.

Figure 6:
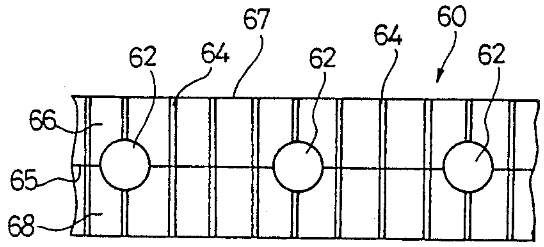
FIG. 6 is a front elevational view of part of an endless belt showing another embodiment of the present invention.
Figure 7:
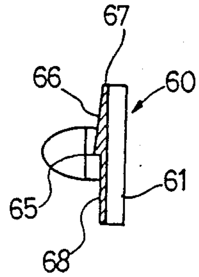
FIG. 7 is a cross sectional view of the endless belt of FIG. 6.
Figure 8:
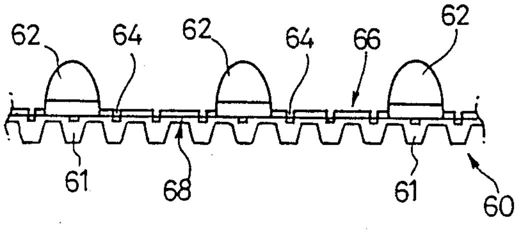
FIG. 8 is a side elevational view of the endless belt of FIG. 6.

FIGS. 6 to 8 show an endless belt according to another embodiment of the present invention. In the present embodiment, a peripheral face portion 66 of an endless belt 60 on one side with respect to a boundary provided by a longitudinal center line 65 of the endless belt 60 is inclined from a side end edge toward the center line 65 such that a portion thereof on the center line 65 is projected from a surface of another peripheral face portion 68 on the other side with respect to the center line 65 so as to provide a step at the location of the center line 65. Further, in the present embodiment, grooves 64 similar to those of the embodiment shown in FIGS. 1 to 5 are formed on both of the peripheral face portions 66 and 68.

With the endless belt 60 of the embodiment described above, the distance between the most projected portion of the peripheral face portion 66 at the location of the center line 65 and the opposing faces of the guide portions 81 of the paper holder 8 is formed smaller than the thickness of the paper, and where the endless belt 60 is employed in place of the endless belt 6 shown in FIGS. 1 to 5, similar effects to those of the embodiment shown in FIGS. 1 to 5 can be attained.

Further, it is be noted that portions of the endless belt 6 corresponding to the grooves 64 are formed as ribs projected from the other peripheral face portion 63 in place of the grooves 64 such that the distance between most projected portions of the ribs and the opposing faces of the guide portions 81 of the paper holder 8 is made smaller than the thickness of the paper, similar effects to those of the embodiment described hereinabove can be attained apparently.

It is to be noted that, in place of the paper holder 8 in which the elongated hole 84 is formed, apparently a linear paper holder may be disposed corresponding to one or each of two peripheral face portions of the endless belt 6 on the opposite sides of the feed pins 62.

What is claimed is:

1. A paper feed tractor for transporting paper having feed holes formed at equal intervals in a row along a side edge thereof, comprising a tractor frame, a belt guide formed on said tractor frame, a sprocket wheel supported for rotation on said tractor frame, an endless belt extending between said sprocket wheel and said tractor frame and adapted to be driven by said sprocket wheel to travel along a guide path formed by said sprocket wheel and said belt guide, said endless belt having feed pins provided projectingly on an outer peripheral face thereof in a row at the same equal intervals to those of the feed holes formed along the side edge of the paper, said belt guide having a liner guide portion thereon, a cover supported at a side edge of said tractor frame along said linear guide portion of said belt guide for selective pivotal motion between a first position in which said cover extends substantially in a parallel relationship above said linear guide portion of said belt guide and a second position in which said cover opens a location above said linear guide portion of said belt guide, and a paper holder formed in the form of an elongated planar plate and bent at the longitudinal opposite end portions thereof to support said paper holder on a face of said cover opposing to said linear guide portion of said belt guide such that a main portion of said paper holder is spaced from said face of said cover, wherein said paper holder is disposed such that, when said cover is at the first position, said main portion thereof is opposed to said linear guide portion of said belt guide in parallel to the longitudinal direction of said linear guide portion and is positioned in parallel to said outer peripheral face of said endless belt on at least one side of said feed pins of said endless belt which travels on said linear guide portion of said belt guide, and a peripheral face portion of said outer peripheral face of said endless belt on which said feed pins are provided projectingly being formed into a non-slipping face on which concave and convex portions of a small difference in dimension are formed wherein when said cover is at the first position, the distance between said convex portions of said non-slipping face of said endless belt and a face of said main portion of said paper holder opposing to said convex portions is made smaller than the thickness of the paper.

2. A paper feed tractor according to claim 1, wherein said main portion of said paper holder has an elongated hole formed therein parallel to the longitudinal direction of said linear guide portion of said belt guide for allowing said feed pins of said endless belt which travels on said liner guide portion of said belt guide to travel in said elongated hole, and said main portion of said paper holder is positioned in parallel to said outer peripheral face of said endless belt.

* * * * *